(12) United States Patent

Schreiber et al.

(10) Patent No.: US 8,594,847 B2
(45) Date of Patent: Nov. 26, 2013

(54) MANIPULATOR, PARTICULARLY INDUSTRIAL ROBOT, HAVING A REDUNDANT SENSOR ARRANGEMENT, AND METHOD FOR THE CONTROL THEREOF

(75) Inventors: Günter Schreiber, Derching (DE); Ulrich Hagn, Pähl (DE)

(73) Assignee: KUKA Laboratories GmbH, Augsburg (DE)

( * ) Notice: Subject to any disclaimer, the term of this patent is extended or adjusted under 35 U.S.C. 154(b) by 500 days.

(21) Appl. No.: 12/738,765

(22) PCT Filed: Oct. 17, 2008

(86) PCT No.: PCT/EP2008/064048
§ 371 (c)(1),
(2), (4) Date: Apr. 19, 2010

(87) PCT Pub. No.: WO2009/050271
PCT Pub. Date: Apr. 23, 2009

(65) Prior Publication Data
US 2010/0234996 A1    Sep. 16, 2010

(30) Foreign Application Priority Data
Oct. 20, 2007 (DE) .......................... 10 2007 050 232

(51) Int. Cl.
*B25J 9/00* (2006.01)
*B25J 13/08* (2006.01)

(52) U.S. Cl.
USPC .................. 700/258; 700/261; 901/2; 901/14

(58) Field of Classification Search
USPC ......... 700/213, 245, 247, 249, 250, 254, 255, 700/258, 260, 261; 901/2, 9, 14–19, 46; 74/490.01–490.06
See application file for complete search history.

(56) References Cited

U.S. PATENT DOCUMENTS

| 5,408,409 A * | 4/1995 | Glassman et al. ............ 600/407 |
| 2003/0135303 A1* | 7/2003 | Arai et al. ..................... 700/245 |

(Continued)

FOREIGN PATENT DOCUMENTS

| DE | 10 2005 054 575 B3 | 4/2007 |
| EP | 0 985 989 A2 | 3/2000 |

(Continued)

OTHER PUBLICATIONS

European Patent Office; International Search Report in International Patent Application No. PCT/EP2008/064048 dated Feb. 6, 2009; 4 pages.

*Primary Examiner* — Jason Holloway
(74) *Attorney, Agent, or Firm* — Wood, Herron & Evans, LLP

(57) ABSTRACT

A manipulator for an industrial robot includes a plurality of actuators associated with a plurality of motion axes. An axis sensor is associated with each of the plurality of motion axes. Each axis sensor is configured to determine a single axis value for the corresponding axis of the plurality of motion axes. A redundant sensor arrangement is configured to ascertain an overall manipulator value. A control is configured to balance the overall manipulator value and the single axis values acquired by the axis sensors. A method of controlling the manipulator is also provided. Axis values are acquired by the axis sensors associated with each of the plurality of motion axes. A redundant manipulator value is acquired by the redundant sensor arrangement. The redundant manipulator value and the axis values acquired by the axis sensors are balanced, and a signal corresponding to the result of the balancing is output.

17 Claims, 3 Drawing Sheets

(56) References Cited

U.S. PATENT DOCUMENTS

Figure 1:
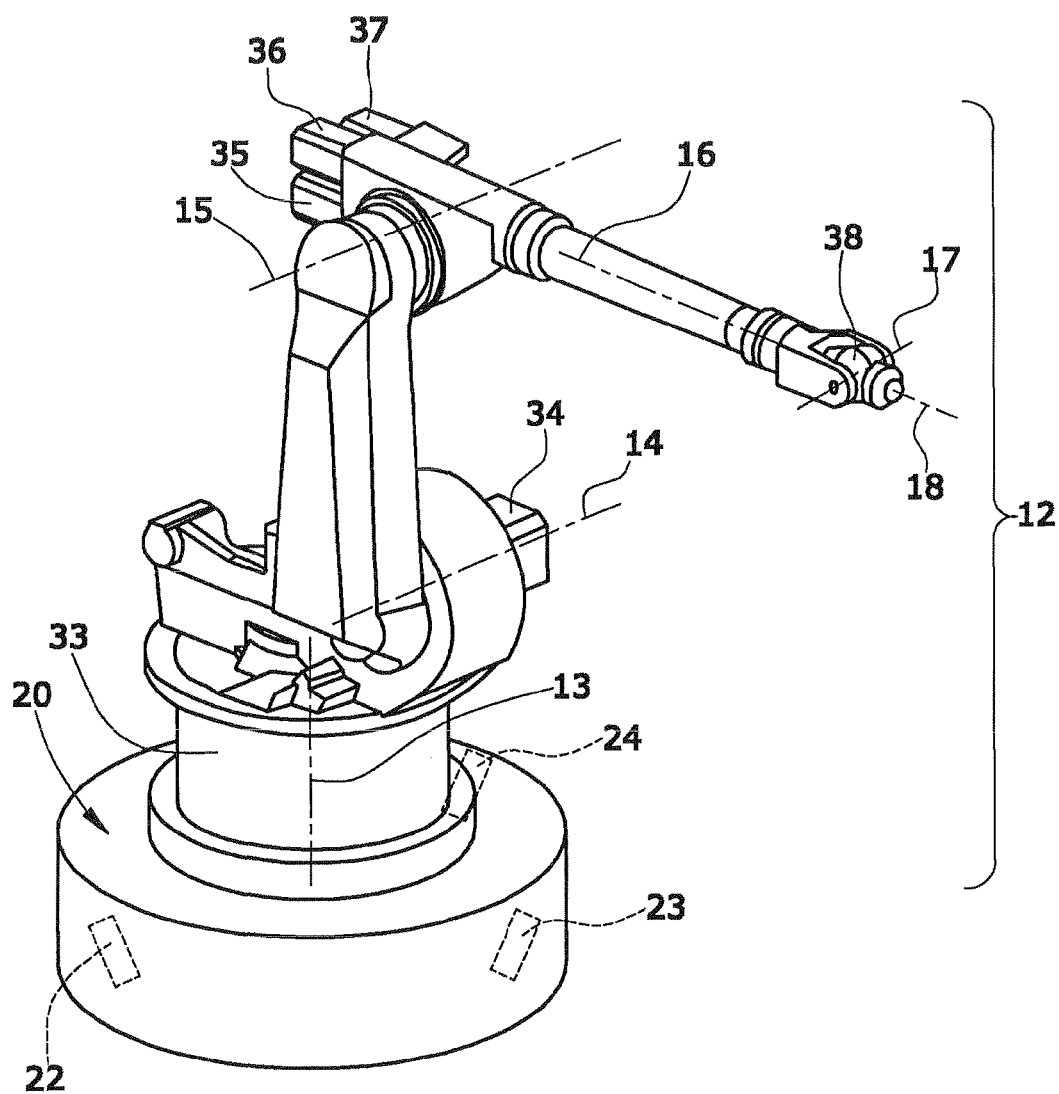

2004/0024311 A1* 2/2004 Quaid, III ............... 600/428
2006/0142657 A1* 6/2006 Quaid et al. ............. 600/424
2007/0021738 A1* 1/2007 Hasser et al. ............ 606/1
2007/0142751 A1* 6/2007 Kang et al. .............. 600/587

FOREIGN PATENT DOCUMENTS

| EP | 1 445 075 A2 | 8/2004 |
| EP | 1 600 833 A2 | 11/2005 |

* cited by examiner

MANIPULATOR, PARTICULARLY INDUSTRIAL ROBOT, HAVING A REDUNDANT SENSOR ARRANGEMENT, AND METHOD FOR THE CONTROL THEREOF

The invention relates to a manipulator, in particular an industrial robot, and a method for the control thereof.

Handling robots, such as industrial robots according to the existing art, have a manipulator normally having two to six motion axes, which are normally rotational motion axes. The motion axes of the manipulator can each have force or torque sensors and/or position sensors assigned to them, with which the position and the forces or torques of the particular motion axes are registered directly. The motion axes are normally joints of a multisectional manipulator arm, or a pivot joint between the manipulator arm and the robot base. An end effector, for example a gripper, is normally situated at the free end of the manipulator or manipulator arm. Besides the pure control or regulation of position with the aid of the position sensors assigned to the motion axes, force and/or moment sensors of the motion axes may be utilized to monitor or control the forces and torques occurring at the manipulator arm.

The monitoring, controlling and regulating of torques and forces that act on the manipulator is a necessary, or at least a desired type of regulation in many applications. For example, the manipulator can be controlled or regulated by means of force and moment axis sensors of the manipulator to generate a particular force or torque on a component. With moving attachments and/or basic components, it is possible to use force and/or moment axis sensors on the manipulator to realize tracking of the manipulator to prevent canting. The force and moment sensors of the manipulator can also be used to detect collisions.

In industrial applications, the industrial robot is normally operated in an automatic mode. The industrial robot uses its manipulator to repeatedly carry out preprogrammed movement patterns independently. Since there is no direct human control in automatic mode, reliable functioning of all control and regulatory circuits is imperative to avoid misinterpreting the position and motion of the manipulator.

When telepresence control of the manipulator is used, the manipulator axis sensors make it possible to give the operator feedback about the forces acting on the manipulator. This method is generally referred to as force reflection. One possible input device may be for example a joystick, which has small electric motors that enable it to give the operator appropriate feedback about the forces acting on the manipulator.

Erroneous readings from the force and/or moment sensors of the manipulator can sometimes have devastating consequences. For example, a discontinuity in a torque reading, caused by a damaged torque sensor, may cause a torque regulator to prescribe a corresponding jump in position. In view of the possible great acceleration rates of the manipulator, this can cause severe injuries and damage due to the out-of-control manipulator.

The object of the invention is to create a manipulator or industrial robot and a suitable method of control which have high reliability in regard to errors of the axis sensors.

In one embodiment of the invention, a manipulator for an industrial robot includes a plurality of motion axes, each of which is assigned an actuator and at least one axis sensor for separately determining single axis values for each axis. The manipulator further includes a redundant sensor arrangement for ascertaining an overall value. In another embodiment of the invention, an industrial robot includes a robot base and a manipulator having a plurality of motion axes movably situated thereon. Each axis includes an actuator and at least one axis sensor. The industrial robot further includes a multi-axial redundant sensor arrangement, which includes a plurality of redundant sensors. In yet another embodiment of the invention, a method for controlling a manipulator having a plurality of motion axes, each having at least one axis sensor, is provided. An axis value may be acquired by an axis sensor. At least one redundant manipulator value may be acquired by the redundant sensor arrangement. The redundant manipulator value and the axis values acquired by the axis sensors may then be balanced. And, a signal may be output, depending on the result of the signal balancing.

The manipulator according to the invention, in particular an industrial robot, has a plurality of motion axes. An actuator and at least one axis sensor are assigned to each motion axis. Individual axis values can be determined for each axis separately by means of the axis sensor. Furthermore, the manipulator according to the invention has a redundant sensor arrangement for determining an overall value. This overall value is preferably determined on the basis of forces and/or moments acting on the manipulator, in particular forces or moments introduced through the actuator.

In addition to the axis sensors, the manipulator according to the invention is also provided with a preferably multiaxial redundant sensor arrangement, which is preferably made up exclusively of force and/or torque sensors that represent redundant sensors. Although it is preferred that the redundant sensor arrangement have a plurality of redundant sensors, in simple embodiments it is also possible for the redundant sensor arrangement to have only a single redundant sensor, which is able to register multidimensional data for example by means of a single detector.

The redundant sensor arrangement preferably registers multiaxially the forces or torques occurring in the particular part at a single location of the manipulator. The redundant sensor arrangement is in particular not situated parallel to a motion axis or an axis sensor, but rather is situated as it were in series before or after an axis sensor of the particular motion axes. The redundant sensor arrangement detects the torques and forces that are transmitted between two motion axes, or between a motion axis and the clamping or fixing of a robot base.

The redundant sensor arrangement preferably ascertains an overall value of all the forces acting on the particular component, which are simultaneously determined as individual addends for each axis separately with the aid of the values delivered by the axis sensors.

The invention also relates to an industrial robot, preferably having a robot base and a manipulator with a plurality of motion axes, movably situated thereon. An actuator and at least one axis sensor is assigned to each motion axis. Furthermore, a preferably multiaxial redundant sensor arrangement is provided, which in an especially preferred embodiment has a plurality of redundant sensors.

The redundant sensor arrangement, and hence the registering of the overall value, can be situated at any location on the industrial robot, i.e., somewhere between the fixing of the robot base and the force introduction point. In a first variant, the redundant sensor arrangement is provided in the robot base or is connected thereto. In a second variant of the invention it is not absolutely necessary to position the redundant sensor arrangement between the robot base and a manipulator that is situated movably thereon. Instead, the redundant sensor arrangement may also be situated between any two axes of the kinematic chain. In this case, with open kinematics the redundant sensor arrangement monitors only the kinematic chain positioned ahead of it. This is sufficient, for example, if only the hand axis of a robot has to be monitored. It is also possible, with a closed kinematic chain, to situate the redundant sensor arrangement at any position in the kinematic chain, in order to be able to monitor the entire kinematic chain.

The forces and torques ascertained by the redundant sensor arrangement in the particular component of the industrial robot must preferably correspond to the sum of the forces or moments that were ascertained directly or indirectly by the axis sensors. The redundant sensor arrangement offers the possibility of checking the force and moment values delivered by the axis sensors for conclusiveness. In this way, an erroneous force or moment value from an axis sensor can be detected immediately, and a dangerous misapplication of a corresponding force or moment regulation of the assigned actuator or actuators can be prevented in time.

If the industrial robot has only position sensors as axis sensors, the measurements of the position sensors can be checked for plausibility by the registration of the forces and torques by the redundant sensor arrangement. A prerequisite for this is that the so-called payload that generates the forces and torques be known in terms of its magnitude and center of mass.

The control and regulation of the actuators of the industrial robot continue to be based on the measurements of the axis sensors, since the latter deliver very precise readings. If an unexpected discrepancy is found between the measurements registered by the redundant sensor arrangement and the expected measurements determined on the basis of the axis sensor readings, it can be concluded that an error was made by the respective axis sensor or sensors or the redundant sensor arrangement, or that an unexpected or expected collision of the industrial robot manipulator with its surroundings occurred. The redundancy may make it possible to determine unambiguously whether the problem is a sensor error or an unexpected or expected collision. The event may be an expected or desired collision of the manipulator, for example, if a desired contact of a tool carried by the manipulator with a work piece is to be detected.

According to a preferred embodiment, the redundant sensors of the redundant sensor arrangement are three one-dimensional forced sensors that are situated on the robot base, which supports the manipulator and is stationary relative to the manipulator. It is especially preferred to have the three force sensors arranged spatially relative to each other, for example in a Cartesian arrangement.

According to the subordinate method claim, the method for controlling a manipulator, in particular an industrial robot with manipulator, exhibits the following procedural steps:
  Acquisition of an axis value by the axis sensor,
  Acquisition of at least one redundant manipulator value by the redundant sensor arrangement,
  Balancing of the redundant manipulator value and the axis value acquired by the axis sensor, and
  Output of a signal, depending on the result of the balancing.

The output signal may trigger a particular action, which depends for example on the signal value. An action to be triggered, in particular a safety-relevant action in the event of an error, may be to bring the industrial robot to a so-called safe state. Such a safe state is reached, for example, when all of the axis brakes take hold and the industrial robot or manipulator no longer executes and can no longer execute any more movement, i.e., for example so that sagging of motion axes due to gravity is also no longer possible.

When a desired collision or contact is detected by the balancing, the central control for the industrial robot can trigger the following work steps, for example for the tool guided by the manipulator.

Alternatively or in addition, a load determination or detection of misloading may also be carried out by the redundant sensor arrangement or the control method. Various regulating methods are used in robotics which require the mass of the tool and of the work piece among their input values. To this end, the operator must enter the load value into the robot controller manually. With the industrial robot or the control method according to the invention, it is possible to recognize whether the load value input by the operator agrees with the load actually present on the industrial robot or deviates from it. Incorrectly entered load values can be detected in this way, and in this case for example a corresponding warning signal can be issued. Alternatively, without inputting a load value, the actual load value can be determined by the redundant sensor system or the control method, and can be entered automatically for example into a control program.

Preferably, the procedural step of balancing is characterized by the following procedural steps:
  Determination of redundant axis values from the redundant manipulator values, and
  Comparison of the redundant axis values with the axis values from the axis sensors.

Thus the readings from the redundant sensor arrangement are used to calculate comparison axis values, which in turn are compared to the axis sensor axis values measured directly by the axis sensors. This requires comparison operations corresponding to the number of axes. The calculation of redundant axis values for each motion axis, and the comparison with the axis values measured by the axis sensors, make it possible to determine at which motion axis critical deviations of the redundant axis value from the axis sensor axis value occur; i.e., at which motion axis there may possibly be a defective axis sensor, or in which direction of motion of the manipulator a desired or undesired collision has occurred.

Preferably, the procedural step of balancing is characterized by the following procedural steps:
  Calculation of an actual manipulator overall value from the axis values delivered by the axis sensors, and
  Comparison of the actual manipulator overall value with the redundant manipulator value.

In this balancing variant only a single comparison needs to be performed, namely a comparison of the actual manipulator overall value with the redundant manipulator value. This variant constitutes a relatively simple test of the redundancy. However, with this balancing method it is only possible to determine whether at least one of the axis sensors is non-functional. Which axis sensor or sensors are non-functional cannot be determined by this method.

Another preferred balancing variant provides for the following:
  Comparison of stored desired values with the registered axis sensor axis values and the registered manipulator values.

In this design of the balancing procedure, the corresponding desired axis values and desired redundant manipulator values for all work steps to be executed by the industrial robot and/or for every static and dynamic situation of the manipulator are stored in a library. The axis values and redundant manipulator values registered by the axis sensors and redundant sensors during operation of the industrial robot or manipulator arm are compared continuously with the stored desired values and are evaluated for deviations. So no balancing of the directly registered axis values with the directly registered redundant manipulator values occurs. The computing effort during operation of the industrial robot is limited to the comparison of the stored desired values with the just-registered redundant manipulator values.

This procedure is essentially suitable for always executing the same tasks at the same speed with the same dimensions, etc. The stored desired values can be determined for example through reference excursions. The desired values can of course also be determined by computation.

The basis for a computed comparison between the values measured by the redundant sensor arrangement and by the axis sensors is knowledge of the current joint positions, the exact joint arrangement of the manipulator joints, and the inertias of the manipulator segments. Only with these values is it possible for example to calculate the influence of the dead weight of the manipulator and to determine ideal-case redundant torques for each motion axis, which can then be compared directly with the torques measured by the respective axis sensors. For complex, non-repetitive tasks, for example manual remote control, this calculation must constantly be performed anew during operation.

An exemplary embodiment of the invention will be explained below in greater detail on the basis of the drawing.

Figure 2:
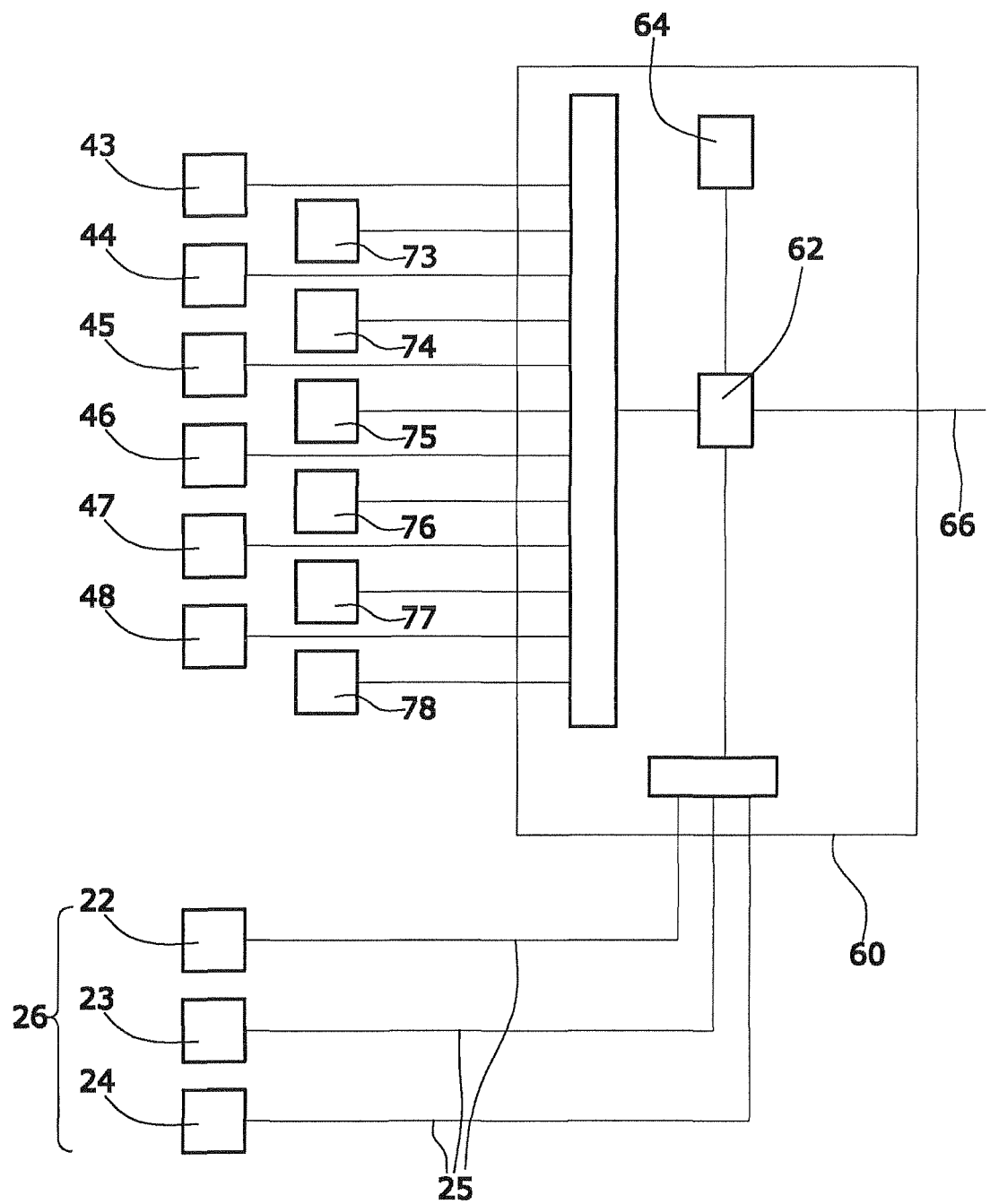

The figures show the following:

FIG. 1 an industrial robot, having a stationary robot base and a manipulator movably situated thereon, and FIG. 2 a schematic depiction of the force and moment sensors of the industrial robot of FIG. 1, including a robot control with a redundancy module.

Figure 3:
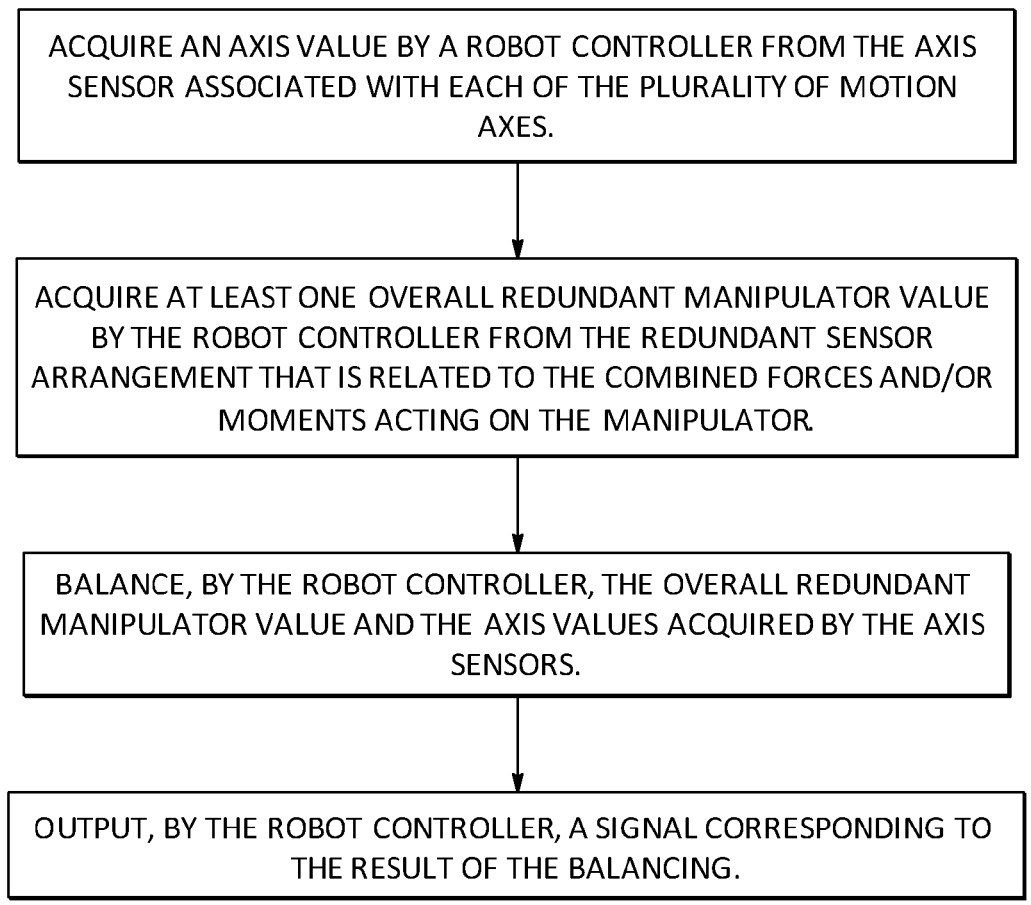

FIG. 3 is a diagram depicting an exemplary method for controlling a manipulator in accordance with the principles of the invention.

FIG. 1 depicts an industrial robot 10, which has a manipulator 12 that sits on a stationary robot base 20 and is rotatable around a motion axis 13 which is designed as a vertical axis. Robot base 20 for its part may be movably attached to a portal which is movable linearly or in some other manner, but it may also be attached immovably to a shop floor or the like. The present industrial robot 10, for example, is utilized in vehicle assembly, but in principle it can also be employed for other tasks.

Manipulator 12 has a total of 6 rotational motion axes 13-18, which are driven by actuators 33-38 in the form of electric motors. Assigned to actuators 33-38 are torque sensors 43-48, none of which are depicted in FIG. 1, which detect the torques transmitted in the respective motion axes 13-18.

Axis sensors 43-48 can be designed as separate torque and force sensors. Alternatively, it is also possible for the transmitted torque or force to be derived from the motor current of the particular electric motor actuator 33-38, and for the motion axis torque in question to be calculated there from. Also provided, as axis sensors 73-78, are position sensors with which the rotational position of the particular motion axis 13-18 is determined. Alternatively, this position can be derived from the number of motor revolutions of the particular actuator motor.

Situated in robot base 20 are three redundant sensors 22, 23, 24 designed as force sensors, which together form a redundant sensor arrangement 26. The three redundant sensors 22-24 are designed as one-dimensional force sensors, and are in a Cartesian arrangement, i.e., at right angles to each other. Robot base 20 may consist for example of two discs lying one on top of the other, which are joined together only through very stiff elastic elements, there being redundant sensors 22-24, designed as highly precise displacement sensors, situated between the two discs.

Redundant sensors 22-24 are connected to a robot controller 60 via a separate redundant line 25. Axis sensors 43-48, 73-78 are also connected to robot controller 60 via their own data lines. The readings of axis sensors 43-48, 73-78 and of redundant sensors 22-24 come together in a redundant module 62 in robot controller 60.

Redundant module 62 ascertains redundant axis values, for example from the redundant manipulator values of redundant sensors 22-24 and the axis values of axis sensors 43-48, 73-78, and possibly from additional sensor values and information from a model memory 64, which redundant axis values are then compared or balanced with the axis values in redundant module 62. Finally, an appropriate signal is emitted via output line 66, depending on the previously performed balancing or comparison.

When the redundant axis values agree to a large extent with the axis sensor axis values, an agreement signal is issued via output line 66. If there is insufficient agreement, an error signal is issued via output line 66 by redundant module 62, and this triggers appropriate actions, such as actuating a safety circuit. If an unacceptable deviation of a motion axis is found, it can be concluded that there is a sensor error in an axis sensor or in one or more redundant sensors.

A prerequisite for the method described above is that robot controller 60 has precise and reliable information about the physics of the manipulator, which is stored in model memory 64. In terms of detail, this is information about the masses and centers of mass of the manipulator arm segments, the positions of the motion axes, etc. Based on this information, it is possible to obtain redundancy information from all of the measurements registered by the sensors.

As an alternative to the method described above, the axis sensor axis values can also be used to calculate the corresponding actual manipulator overall values, which are then compared directly to the measured redundant manipulator values.

Alternatively, it is also possible to store in model memory 64 target values for all sensors and motion phases or situations, determined from so-called training excursions, which can always be directly compared or balanced with the values registered by sensors 43-48, 73-78, 22-24.

Regulation of the manipulator motions in normal operations continues to be based on the measurements that are ascertained by axis sensors 43-48, 73-78, since these measurements are highly precise.

Redundant sensors 22-24 or redundant sensor arrangement 26 may also be used, independent of the check of the axis sensors, to determine the absolute load acting on manipulator 12, so that overload detection and hence overload protection can be realized in a simple manner as a result.

The invention claimed is:

1. A manipulator for an industrial robot, comprising:
   a plurality of actuators, each actuator associated with a respective one of a plurality of motion axes;
   at least one axis sensor associated with each of the plurality of motion axes, the axis sensor configured to determine a single axis value for the corresponding axis of the plurality of motion axes;
   a redundant sensor arrangement including a plurality of redundant sensors redundant to one another and configured to ascertain an overall manipulator value related to combined forces and/or moments acting on the overall manipulator; and
   a controller configured to balance the overall manipulator value and the single axis values acquired by the axis sensors.

2. The manipulator of claim 1, wherein the redundant sensor arrangement ascertains the overall manipulator value by ascertaining a sum value of forces, moments, or combinations thereof acting on the manipulator.

3. The manipulator of claim 1, wherein the redundant sensor arrangement ascertains the overall manipulator value of all forces, moments, or combinations thereof acting on a particular component of the manipulator.

4. The manipulator of claim 1, wherein the redundant sensor arrangement is of multiaxial design.

5. The manipulator of claim 1, wherein the axis sensors are provided for ascertaining values as individual addends for each axis of the plurality of motion axes separately.

6. The manipulator of claim 1, wherein the control is further configured to output a signal corresponding to the result of the balancing.

7. An industrial robot, comprising:
- a stationary robot base;
- a manipulator supported by the stationary robot base, the manipulator having a plurality of motion axes movably situated thereon, the manipulator including:
  - a plurality of actuators corresponding to the plurality of motion axes; and
  - at least one axis sensor associated with each of the axes of the plurality of motion axes;
  - a multiaxial redundant sensor arrangement including a plurality of redundant sensors redundant to one another; and
- a robot controller configured to:
  - acquire an axis value by the axis sensor for each of the plurality of motion axes;
  - acquire at least one overall redundant manipulator value by the redundant sensor arrangement that is related to combined forces and/or moments acting on the overall manipulator;
  - balance the overall redundant manipulator value and the axis values acquired by the axis sensors; and
  - output a signal corresponding to the result of the balancing.

8. The industrial robot of claim 7, wherein the redundant sensors are force sensors.

9. The industrial robot of claim 8, wherein the redundant sensor arrangement comprises:
- three redundant sensors arranged spatially relative to each other.

10. The industrial robot of claim 7, wherein the redundant sensors are moment sensors.

11. The industrial robot of claim 7, wherein the redundant sensor arrangement is situated on the stationary robot base.

12. The industrial robot of claim 7, wherein the axis sensors associated with each of the axes of the plurality of motion axes are designed as sensors selected from a group consisting of force sensors, torque sensors, position sensors, and combinations thereof.

13. A method of controlling a manipulator for an industrial robot, the manipulator including a plurality of motion axes, to each of which at least one axis sensor is associated, the manipulator further including a redundant sensor arrangement, the method comprising:
- acquiring an axis value by a robot controller from the axis sensor associated with each of the plurality of motion axes,
- acquiring at least one overall redundant manipulator value by the robot controller from the redundant sensor arrangement that is related to combined forces and/or moments acting on the overall manipulator, wherein the redundant sensor arrangement includes a plurality of redundant sensors redundant to one another,
- balancing, by the robot controller, the overall redundant manipulator value and the axis values acquired by the axis sensors, and
- outputting, by the robot controller, a signal corresponding to the result of the balancing.

14. The method of claim 13, wherein balancing comprises:
- determining a redundant axis value from the overall redundant manipulator value, and comparing the redundant axis value with an axis value of the axis values acquired by the axis sensors.

15. The method of claim 13, wherein balancing comprises:
- calculating a manipulator sum value from the axis values acquired by the axis sensors, and
- comparing the manipulator sum value with the overall redundant manipulator value.

16. The method of claim 13, wherein balancing comprises:
- comparing a stored desired value with a respective acquired axis value of the axis values acquired by the axis sensors and the acquired overall redundant manipulator value.

17. The method of claim 13, wherein balancing comprises:
- comparing a stored desired redundant sensor value with a respective acquired axis value of the axis values acquired by the axis sensors and the acquired overall redundant manipulator value.

* * * * *